United States Patent
Shin et al.

(10) Patent No.: US 11,815,687 B2
(45) Date of Patent: Nov. 14, 2023

(54) CONTROLLING HEAD-MOUNTED DEVICE WITH GESTURES INTO WEARABLE DEVICE

(71) Applicant: GOOGLE LLC, Mountain View, CA (US)

(72) Inventors: Dongeek Shin, Santa Clara, CA (US); Isaac Allen Fehr, Mountain View, CA (US); Sean Kyungmok Bae, Rockville, MD (US); Ding Xu, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/653,218

(22) Filed: Mar. 2, 2022

(65) Prior Publication Data
US 2023/0280591 A1    Sep. 7, 2023

(51) Int. Cl.
G02B 27/01 (2006.01)
G06F 3/01 (2006.01)
G02B 27/00 (2006.01)
G06T 19/00 (2011.01)

(52) U.S. Cl.
CPC ..... *G02B 27/0172* (2013.01); *G02B 27/0093* (2013.01); *G06F 3/013* (2013.01); *G06F 3/017* (2013.01); *G06T 19/006* (2013.01); G02B 2027/014 (2013.01); G02B 2027/0138 (2013.01)

(58) Field of Classification Search
CPC ............ G02B 27/0172; G02B 27/0093; G02B 2027/0138; G02B 2027/014; G06F 3/013; G06F 3/017; G06T 19/006
See application file for complete search history.

(56) References Cited

U.S. PATENT DOCUMENTS

| | | | | |
|---|---|---|---|---|
| 10,852,839 B1* | 12/2020 | Ravasz | ................... | G06F 3/017 |
| 11,175,734 B1* | 11/2021 | Hossain | ................... | G06F 3/014 |
| 11,200,869 B1* | 12/2021 | Post | ................... | G06F 3/04842 |
| 2013/0304479 A1* | 11/2013 | Teller | ................... | G06F 3/167 704/E21.001 |
| 2015/0192777 A1* | 7/2015 | Bae | ................... | G02B 27/0101 359/245 |
| 2015/0254882 A1* | 9/2015 | Englert | ................ | G02B 27/017 345/633 |
| 2015/0271396 A1* | 9/2015 | Lee | ......... | H04N 23/57 348/222.1 |
| 2015/0317518 A1* | 11/2015 | Fujimaki | .............. | G02B 27/017 345/633 |
| 2016/0054791 A1* | 2/2016 | Mullins | .................. | G09G 3/003 345/173 |
| 2016/0191803 A1* | 6/2016 | Lee | ......... | G06F 3/041 348/207.1 |
| 2016/0320923 A1* | 11/2016 | Hossain | .............. | G06F 3/04886 |
| 2016/0335981 A1* | 11/2016 | Koo | ....................... | G09G 5/003 |

(Continued)

*Primary Examiner* — Ibrahim A Khan

(74) *Attorney, Agent, or Firm* — Brake Hughes Bellermann LLP

(57) ABSTRACT

A method performed by a head-mounted device can include, based on a front-facing camera included in the head-mounted device capturing an image of a wearable device, configuring the head-mounted device to receive input via the wearable device, determining that a gesture received by the wearable device includes a request to launch an application, and, in response to determining that the gesture includes the request to launch the application, launching the application.

20 Claims, 13 Drawing Sheets

(56) References Cited

U.S. PATENT DOCUMENTS

| | | | |
|---|---|---|---|
| 2017/0060518 A1 | 3/2017 | Hong et al. | |
| 2017/0123757 A1* | 5/2017 | Lancaster | G06F 3/167 |
| 2017/0195629 A1* | 7/2017 | Wexler | H04W 4/029 |
| 2017/0316762 A1* | 11/2017 | El-Ghoroury | G06F 3/012 |
| 2017/0324794 A1 | 11/2017 | Jeong et al. | |
| 2018/0054487 A1* | 2/2018 | Hebsur | H04L 41/0806 |
| 2018/0217681 A1* | 8/2018 | Hiroi | G02B 27/0172 |
| 2018/0219988 A1* | 8/2018 | Jain | H04W 4/80 |
| 2019/0121522 A1* | 4/2019 | Davis | G06V 40/28 |
| 2019/0146219 A1* | 5/2019 | Rodriguez, II | G06F 1/163 345/633 |
| 2019/0265787 A1* | 8/2019 | Vennström | G06F 1/163 |
| 2019/0384420 A1* | 12/2019 | Cho | G06F 3/0346 |
| 2020/0004016 A1* | 1/2020 | Gross | G02B 27/017 |
| 2020/0042089 A1* | 2/2020 | Ang | G06F 3/016 |
| 2020/0104039 A1* | 4/2020 | Robertson | G06N 3/045 |
| 2021/0089117 A1* | 3/2021 | Bodolec | G09G 5/37 |
| 2021/0263592 A1* | 8/2021 | Chang | G06F 3/017 |
| 2021/0263593 A1* | 8/2021 | Lacey | G06V 40/28 |
| 2021/0289336 A1* | 9/2021 | Zhang | H04W 56/0055 |
| 2022/0155593 A1* | 5/2022 | Kaneko | G02B 27/017 |
| 2022/0291887 A1* | 9/2022 | Kaneko | G06F 3/0346 |
| 2022/0334648 A1* | 10/2022 | Okamoto | G06F 3/04847 |
| 2022/0337780 A1* | 10/2022 | Huang | G06V 40/15 |
| 2022/0350414 A1* | 11/2022 | Lee | G06F 3/012 |

* cited by examiner

US 11,815,687 B2

CONTROLLING HEAD-MOUNTED DEVICE WITH GESTURES INTO WEARABLE DEVICE

TECHNICAL FIELD

This description relates to head-mounted devices.

BACKGROUND

Head-mounted devices can create a virtual reality or augmented reality environment. Head-mounted devices can capture input via one or more cameras and present an output via a display.

SUMMARY

According to an example, a method performed by a head-mounted device can include, based on a front-facing camera included in the head-mounted device capturing an image of a wearable device, configuring the head-mounted device to receive input via the wearable device, determining that a gesture received by the wearable device includes a request to launch an application, and, in response to determining that the gesture includes the request to launch the application, launching the application.

According to an example, a non-transitory computer-readable storage medium can include instructions stored thereon. The instructions, when executed by at least one processor, can be configured to cause a head-mounted device to, based on a front-facing camera included in the head-mounted device capturing an image of a wearable device, configure the head-mounted device to receive input via the wearable device, interpret, based on gesture data received from the wearable device and a state of the head-mounted device, a gesture, the gesture being included in a library associated with the state of the head-mounted device, and, in response to interpreting the gesture, perform an action associated with the gesture.

According to an example, a head-mounted device can include a frame configured to mount onto a head of a user, a display supported by the frame, the display being configured to face at least one eye of the user, a front-facing camera supported by the frame, the front-facing camera being configured to capture images from a direction opposite from the user, a gaze-tracking camera supported by the frame, the gaze-tracking camera being configured to capture a direction to which at least one eye of the user is looking, and a processor supported by the frame. The processor can be configured to transition the head-mounted device into a state in which the head-mounted device receives input via a wearable device based on determining that the front-facing camera captured an image of the wearable device, and determining, based on image data captured by the gaze-tracking camera, that the user is focusing on an image presented by the display.

The details of one or more implementations are set forth in the accompanying drawings and the description below. Other features will be apparent from the description and drawings, and from the claims.

BRIEF DESCRIPTION OF THE DRAWINGS

Like reference numbers in the various figures refer to like elements.

DETAILED DESCRIPTION

A head-mounted device can receive input via a wearable device, allowing a user to control the head-mounted device with gestures into the wearable device. The head-mounted device can receive input via, for example, a touchscreen display included in the wearable device. The head-mounted device can determine whether a user intends to provide input to the head-mounted device or the wearable device based on camera input received by the head-mounted device. For example, the head-mounted device can determine that the user intends to provide input to the head-mounted device via the wearable device based on a front-facing camera included in the head-mounted device capturing an image of the wearable device. In some examples, the head-mounted device can determine that the user intends to provide input to the head-mounted device via the wearable device based on determining that the front-facing camera captured an image of the wearable device while the wearable device was disposed on an arm of the user. In some examples, the head-mounted device can determine that the user intended to provide input to the head-mounted device via the wearable device based on determining that the front-facing camera captured the image of the wearable device and a gaze-tracking camera captured an image of the user not looking at the wearable device and/or looking at an item included in a display of the head-mounted device.

The head-mounted device can perform actions based on the input into the wearable device. In some examples, the input into the wearable device can include a gesture into the touchscreen of the wearable device. In some examples, the head-mounted device and/or wearable device can interpret the gesture based on a state of the head-mounted device. The state of the head-mounted device can include, for example, a home screen, in which the gesture would be interpreted as selecting and/or identifying an application for the head-mounted device to launch. In some examples the state can include an open application, and the gesture could include an input to the open application such as a swipe gesture, which would prompt the head-mounted device to change a portion of a document displayed on the display to the user.

Figure 1A:
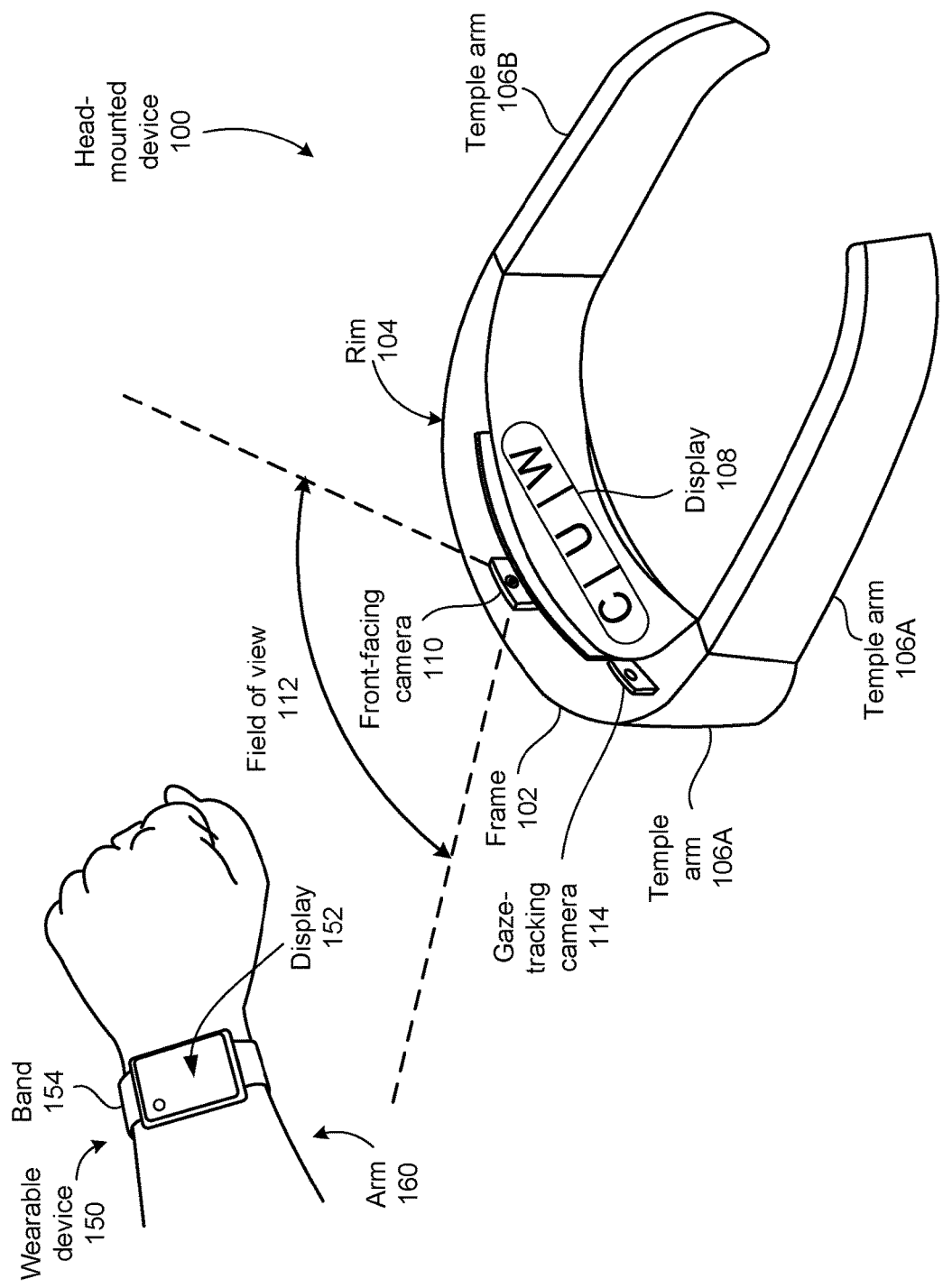
FIG. 1A is a diagram showing a head-mounted device and a wearable device.

FIG. 1A is a diagram showing a head-mounted device 100 and a wearable device 150. The head-mounted device 100 can include a frame 102 that supports a display 108, a front-facing camera 110, and a gaze-tracking camera 114. The frame 102 can include one or more rims 104 that support the display 108. In some examples, the frame 102 can include a single rim 104, and present a single display 108 to the user. In some examples, the frame 102 can include two rims 104, which each support a separate display 108, in a similar manner to glasses. The frame 102 can be attached to, and/or include, two temple arms 106A, 106B, which are flexibly attached to a front portion of the frame 102, and rest on a user's ears to support the head-mounted device 100.

The front-facing camera 110 can face, and/or capture images from, a front of the head-mounted device 100, and/or away from a user wearing the head-mounted device 100. While FIG. 1A shows a triangular field of view 112 in two dimensions, the field of view 112 can be conical in three dimensions. The field of view 112 captured by the front-facing camera 110 can be presented to the user via the display 108. In the example shown in FIG. 1A, the display 108 superimposes a menu including the options 'C', which can represent a calendar application, 'U', which can represent a ride service application, and 'W', which can represent a word processing application. This presentation of a menu of applications can be an example of a home screen. The gaze-tracking camera 114 can capture images of the user's eyes, and determine a direction that the user's eyes are pointing to and/or objects that the user is focusing on. The objects that the user is focusing on could include physical objects in front of the head-mounted device 100, and/or graphical objects presented by the display 108.

The head-mounted device 100, as described and illustrated below, may include any hardware that may be worn on a head of a user and that leverages or utilizes its position on the user's head, and/or that relies on or augments user abilities (e.g., sight, hearing, or head position/orientation) to provide functionality to the user. In some implementations, functionality of the head-mounted device 100 may alternatively or additionally be provided using other, different types of wearable devices, such as watches, rings, or clothing. For example, the head-mounted device 100 may include or represent glasses, augmented reality glasses, goggles, a hat, helmet, headband, or other headwear, including conventional headwear retrofitted with suitable hardware/software.

In the example shown in FIG. 1A, the wearable device 150 is captured by the front-facing camera 110 within the field of view 112 captured by the front-facing camera 110. The wearable device 150 can include, for example, a smartwatch disposed on an arm 160 of the user. The arm 160 of the user can include an extremity extending from the torso of the user, such as the upper arm, forearm, wrist, thumb, and/or any fingers. The wearable device 150 can include a display 152 attached to the user's arm 160 by a band 154. The display 152 can include a touchscreen display, which presents graphical output to the user and receives touch input from the user. A smartwatch is one example of the wearable device 150, and the wearable device 150 could also include a ring or other electronic device worn on a body of a user.

Figure 1B:
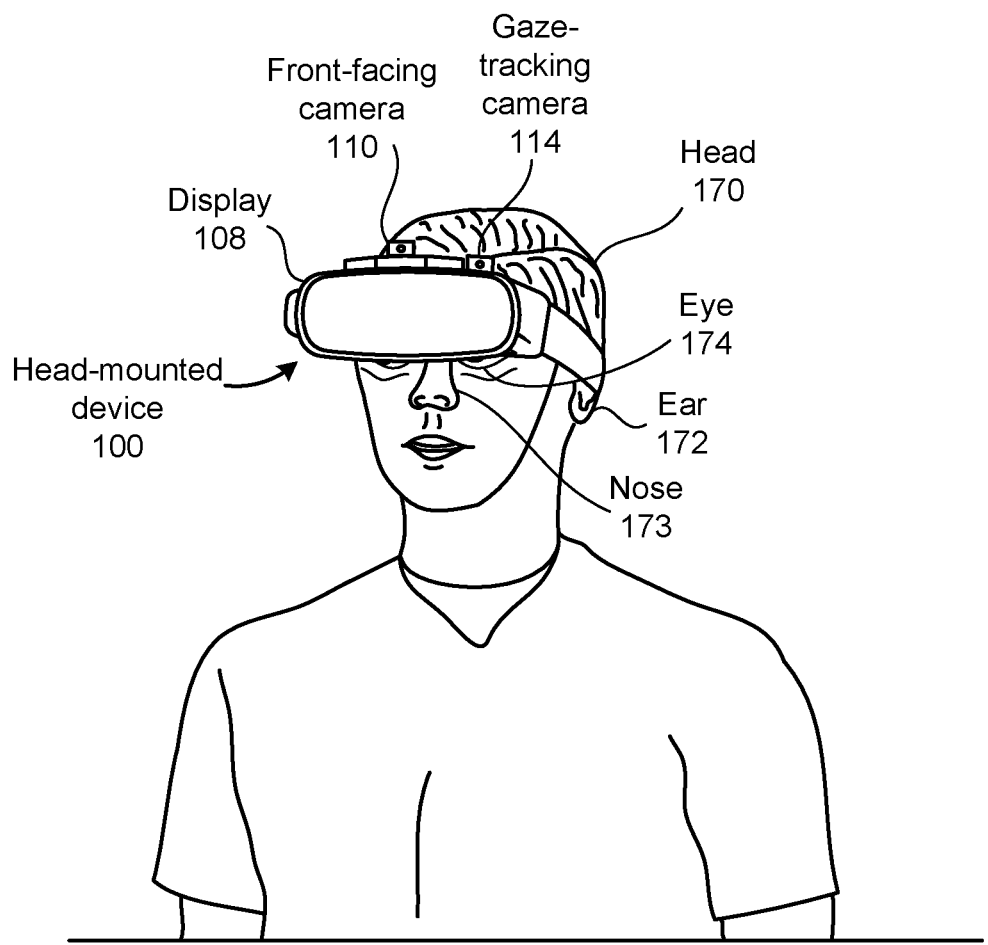
FIG. 1B is a diagram showing the head-mounted device worn on a head of a user.

FIG. 1B is a diagram showing the head-mounted device 100 worn on a head 170 of a user. The head-mounted device 100 can be supported by the user's ears 172 (only one of which is shown in FIG. 1B) and the nose 173 of the user. When worn on the head 170 of the user, the front-facing camera 110 can face and/or capture images away from, and/or on an opposite side of the head-mounted device 100 from, the user. When the head-mounted device 100 is worn on the head 170 of the user, the display 108 can face toward the user's eyes 174. When the head-mounted device 100 is worn by the user, the gaze-tracking camera 114 can face toward, and/or capture images of, the user's eyes 174.

Figure 2:
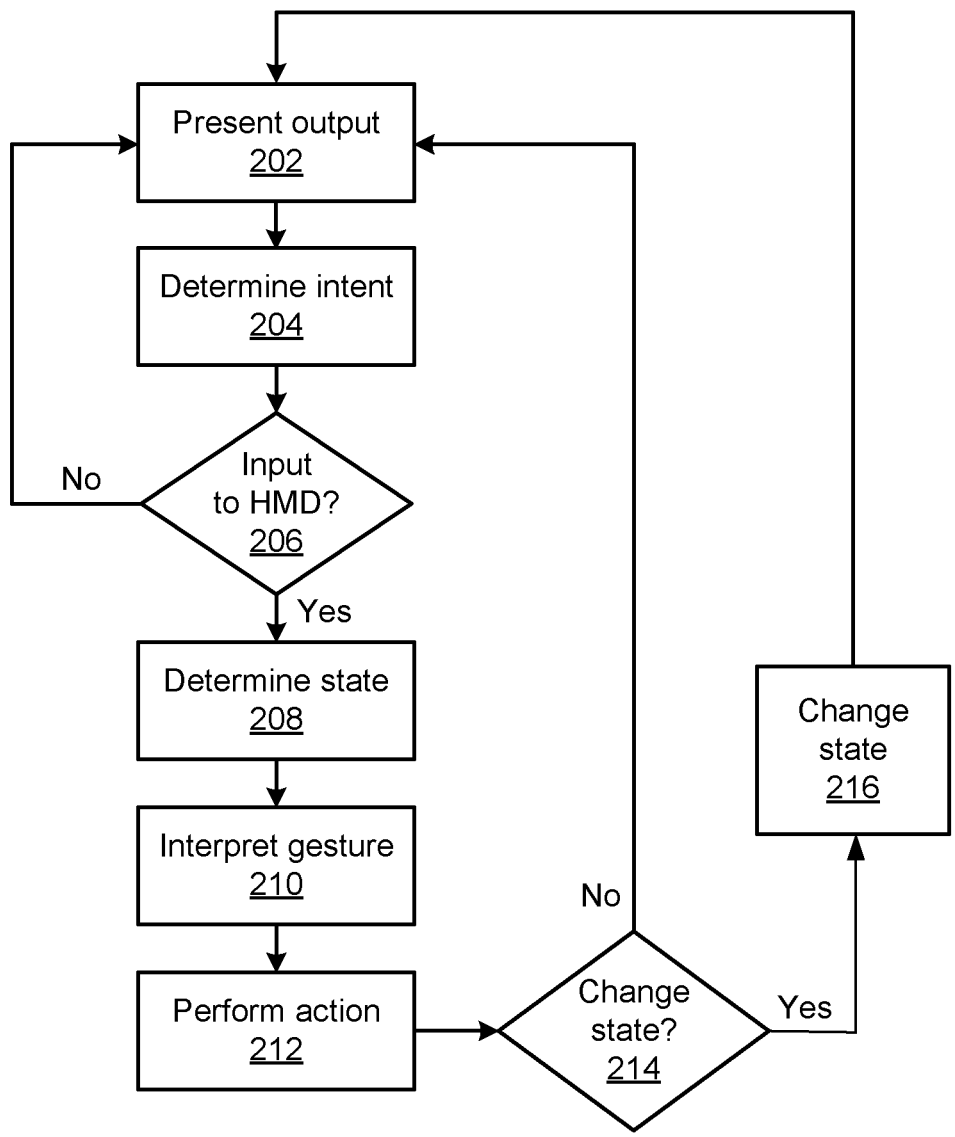
FIG. 2 is a flowchart showing actions performed by the head-mounted device.

FIG. 2 is a flowchart showing actions performed by the head-mounted device 100. The head-mounted device 100 can present output 202. The head-mounted device 100 can present the output 202 via the display 108. The output 202 can include, for example, a menu presenting applications that the user can launch, or an application presenting output to the user and ready to receive input from the user.

The head-mounted device 100 can determine the intent of the user (204). The head-mounted device 100 can, for example, determine whether the user intends to provide input to the wearable device 150 (not shown in FIG. 2), or to provide input to the head-mounted device 100 via the wearable device 150. In some examples, the head-mounted device 100 can determine that the user intends to provide input to the head-mounted device 100 via the wearable device 150 based on the front-facing camera 110 capturing an image of the wearable device 150, based on the front-facing camera 110 capturing an image of the wearable device 150 being disposed on the arm 160 of the user, based on the gaze-tracking camera 114 capturing images indicating that the user is not looking at and/or focusing on the wearable device 150, and/or the gaze-tracking camera 114 capturing images indicating that the user is focusing on an image presented by the display 108.

If the head-mounted device 100 determines that the user does not intend to provide input to the head-mounted device (206), then the head-mounted device 100 continues presenting output (202). The wearable device 150 can then process any input independently of the head-mounted device 100.

If the head-mounted device 100 determines that the user does intend to provide input to the head-mounted device 100 via the wearable device 150, then the head-mounted device 100 can determine a state of the head-mounted device 100 (208). The state can include, for example, a home state in which the display 108 presents a menu with applications for the user to open, or a particular application that is open. The head-mounted device 100 can take the state of the head-mounted device 100 into account when interpreting a gesture received by the wearable device 150.

In some examples, when the head-mounted device 100 is in the home and/or menu state, the head-mounted device 100 does not send image data to the wearable device 150 in response to the configuration of the head-mounted device 100 to receive input via the wearable device 150. While in the home and/or menu state and ready to receive input via the wearable device 150, the head-mounted device 100 can present the menu via the display 108 instead of via the wearable device 150.

The head-mounted device 100 can interpret the gesture (210) received by the wearable device 150. In some examples, the wearable device 150 can interpret the gesture received by the wearable device 150 via the display 152 and send, to the head-mounted device 100, a signal indicating the gesture received by the wearable device 150. In some examples, the wearable device 150 can send, to the head-mounted device 100, raw touch input data received by wearable device 150 via the display 152. The raw touch input data can include, for example, locations of times of contact of a body part of a user, such as a finger, on the display 152 of the wearable device 150.

In some examples, the head-mounted device 100 can compare the received touch input data to gestures in a library associated with the state of the head-mounted device 100. For example, when the state of the head-mounted device 100 is a home state in which the head-mounted device 100 presents a menu of applications to the user, the library of gestures can include multiple letters, such as the twenty-six letters in the alphabet, with each of the letters being associated with an application that the head-mounted device 100 can launch. In some examples, when the state of the head-mounted device 100 is that an application is open, the head-mounted device 100 can compare the touch input data to swipe gestures that change what portion of a document the head-mounted device 100 displays to the user via the display 108, and/or other gestures associated with inputs to the open application.

After interpreting the gesture (210), the head-mounted device 100 can perform the action (212) associated with the interpreted gesture. The head-mounted device 100 can, for example, launch an application associated with the interpreted gesture, or change presentation of a document based on a swipe gesture.

After performing the action (212), the head-mounted device 100 can determine whether to change a state (214) of the head-mounted device 100. The head-mounted device 100 can determine whether to change the state (214) based on whether an application is launched and/or closed. If no application is launched and/or closed by the performed action, then the head-mounted device 100 can determine that the state should not be changed, and continue presenting output (202). If the head-mounted device 100 determines that the state should be changed, then the head-mounted device 100 can change the state (216) of the head-mounted device 100. The head-mounted device 100 can change the state (216) by, for example, noting that an application is open or closed, or noting that the head-mounted device 100 is in the menu or home state. After changing the state (216), the head-mounted device 100 can continue presenting output (202).

Figure 3:
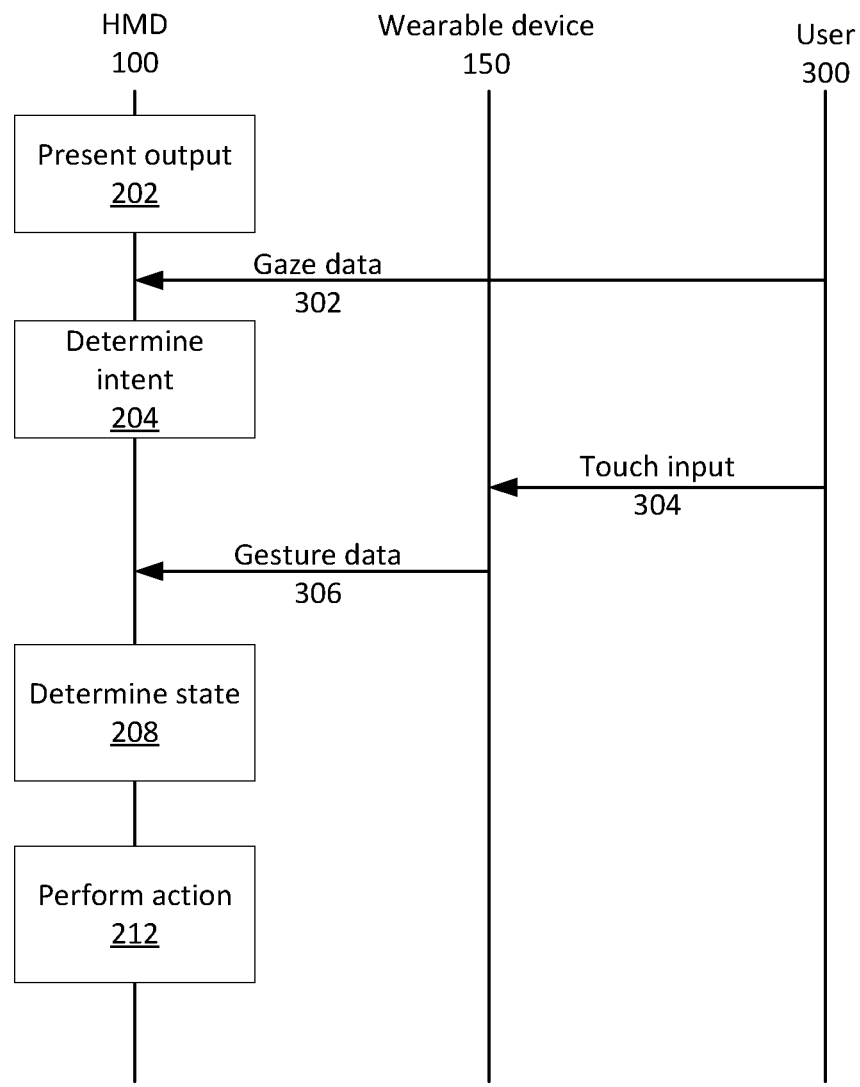
FIG. 3 is a timing diagram showing actions performed by the head-mounted device, the wearable device, and the user.

FIG. 3 is a timing diagram showing actions performed by the head-mounted device 100, the wearable device 150, and a user 300. The user 300 can be the person to whom the arm 160 shown in FIG. 1A and the head 170 shown in FIG. 1B are attached.

The head-mounted device 100 can present output 202. The output (202) can include, for example, a menu of applications to open, or an open application.

The head-mounted device 100 can receive gaze data 302 from the wearable device 150 worn by the user 300. In some examples, the front-facing camera 110 of the head-mounted device 100 can capture an image of the wearable device 150 and/or arm 160 of the user 300, as shown in FIG. 1A. In some examples, the gaze-tracking camera 114 can capture images of the user's 300 eyes 174, and/or a direction in which the eye 174 is pointing.

Based on the gaze data 302, the head-mounted device 100 can determine the intent (204) of the user 300. The head-mounted device 100 can determine, for example, whether the user 300 intends to provide input into the wearable device 150, or if the user 300 intends to provide input to the head-mounted device 100 via the wearable device 150. The head-mounted device 100 can determine that the user 300 intends to provide input to the head-mounted device 100 via wearable device 150 based, for example, on the front-facing camera 110 capturing, and/or the head-mounted device 100 recognizing, an image of the wearable device 150 and/or an image of the wearable device 150 disposed on the arm 160 of the user 300. The head-mounted device 100 can determine that the user 300 intends to provide input to the head-mounted device 100 based, for example, on data captured by the gaze-tracking camera 114 indicating that the user 300 is not looking at the wearable device 150, and/or is looking at an object presented by the display 108.

The user 300 can provide touch input 304 to the wearable device 150. The user 300 can provide touch input 304 to the wearable device 150 by, for example, tapping and/or sliding a part of the user's 300 body, such as the user's 300 finger, on the touch screen display 152 of the wearable device 150.

The wearable device 150 can send gesture data 306 to the head-mounted device 100. In some examples, the wearable device 150 can interpret a touch input 304, and the gesture data 306 can identify a gesture interpreted by the wearable device 150. In some examples, the wearable device 150 can send the raw touch data to the head-mounted device 100, and the gesture data 306 can include the raw touch input data, such as locations and/or times of touch input received by the wearable device 150 into the touch screen display 152.

After receiving the gesture data 306, the head-mounted device 100 can determine the state (208) of the head-mounted device 100. After determining the state (208), the head-mounted device 100 can perform an action (212). The action can include, for example, launching an application identified by the touch input or providing input within an open application.

Figure 4:
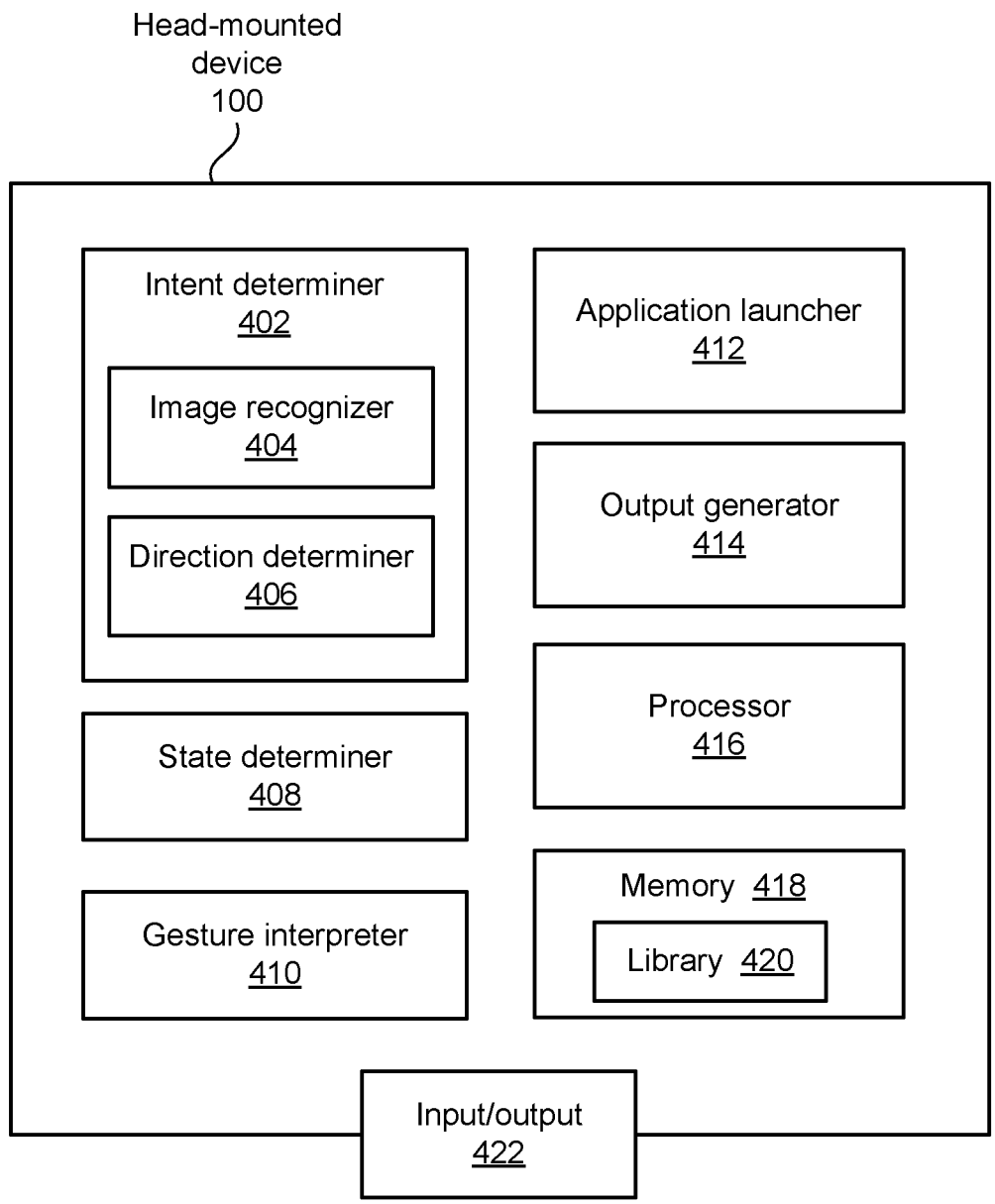
FIG. 4 is a block diagram of the head-mounted device.

FIG. 4 is a block diagram of the head-mounted device 100. The head-mounted device 100 can include an intent determiner 402. The intent determiner 402 can determine whether a user 300 intends to provide input to the wearable device 150, or to the head-mounted device 100 via the wearable device 150. The head-mounted device 100 can configure the head-mounted device 100 to receive input from the wearable device 150 in response to determining that the user intends to provide input to the head-mounted device 100 via the wearable device 150.

The intent determiner 402 can include an image recognizer 404. The image recognizer 404 can recognize images captured by the front-facing camera 110. The image recognizer 404 can recognize, for example, the wearable device 150, and whether the wearable device 150 is disposed on the user's 300 arm 160 within the field of view 112. The intent determiner 402 can determine, based on the image recognizer 404 recognizing the wearable device 150, and/or the wearable device 150 disposed on the user's 300 arm 160 within the field of view 112, that the user intends to provide input to the head-mounted device 100 via the wearable device 150. Based on determining that the user intends to provide input to the head-mounted device 100 via the wearable device 150, the intent determiner 402 can transition the head-mounted device 100 into a state in which the head-mounted device 100 receives input via the wearable device 150.

The intent determiner 402 can include a direction determiner 406. A direction determiner 406 can determine a direction that the user's 300 eyes 174 are facing and/or pointing, and/or an object that the eyes 174 are focusing on. The direction determiner 406 can determine the direction and/or focus based on image data captured by the gaze-tracking camera 114. The intent determiner 402 can determine that the user 300 intends to provide input to the head-mounted device 100 via the wearable device 150 based on the direction determiner 406 determining that the user 300 is not looking at the wearable device 150, and/or that the user is looking at an object on the display 108.

In some examples, the intent determiner 402 can determine the intent of the user to provide input to the head-mounted device 100 via the display 152 of the wearable device 150 based on movement of the wearable device 150. An accelerometer included in the wearable device 150 can determine that the wearable device 150 is moving, and the wearable device 150 can send movement data to the head-mounted device 100. The head-mounted device 100 can determine that the user 300 moved the wearable device 150 toward the head 170 of the user 300. Based on determining that the user 300 moved the wearable device 150 toward the head 170 of the user 300, the intent determiner 402 can determine that the user intends to provide input to the head-mounted device 100 via the display 152 of the wearable device 150.

In some examples, the intent determiner 402 can determine the intent of the user 300 to provide input to the head-mounted device 100 via the display 152 of the wearable device 150 based on input by the user 300 to the wearable device 150. The input can be input that is not typically an input to the wearable device 150, and/or is orthogonal to known and/or typical inputs to the wearable device 150. The input indicating intent of the user to provide input to the head-mounted device 100 via the display 152 of the wearable device 150 can include, for example, the user 300 tapping on a side of the wearable device 150 a specified number of times, such as two taps on a side (or other predetermined portion) of the wearable device 150, or a "pinching" gesture on the display 152 of the wearable device 150.

The head-mounted device 100 can include a state determiner 408. The state determiner 408 can determine a state of the head-mounted device 100, such as whether the head-mounted device 100 is in a home state and/or menu state, or whether the head-mounted device 100 is executing a launched application. The state of the head-mounted device 100 can be relevant to interpreting a gesture received by the head-mounted device 100 via the wearable device 150.

The head-mounted device 100 can include a gesture interpreter 410. The gesture interpreter 410 can interpret gestures, and/or raw touch input data received by the head-mounted device 100 from the wearable device 150, to determine a command inputted by the user 300. The gesture interpreter 410 can interpret the raw touch data based on the state of the head-mounted device 100 determined by the state determiner 408. When the head-mounted device 100 is in the home and/or menu state, the gesture interpreter 410 can identify an application associated with the interpreted gesture, and/or interpret the gesture as an instruction and/or request to launch an application identified by the interpreted gesture. The gesture received by the display 152 of the wearable device 150 can thereby be considered to have identified the application to launch.

In some examples, the gesture interpreter 410 can present the interpreted gesture on the display 108 of the head-mounted device 100. The gesture presented on the display 108 by the gesture interpreter 410 may not be a one-to-one mapping of the raw touch data representing the gesture received by the display 152 of the wearable device 150. The gesture interpreter 410 can, for example, map the raw touch data to a letter, and present the letter, in a predetermined form (such as a particular font), on the display 108. The pattern of the gesture that the gesture interpreter 410 presents on the display 108 can therefore be different than the pattern of the gesture received by the display 152 of the wearable device 150.

The head-mounted device 100 can include an application launcher 412. The application launcher 412 can launch an identified application, such as a calendar application, a ride service application, or a word processing application, based on the gesture interpreted by the gesture interpreter 410. The application launcher 412 can launch the application based on the identification of the application by the gesture interpreter 410.

The head-mounted device 100 can include an output generator 414. The output generator 414 can generate output, such as graphical output, for presentation and/or display by the display 108. The output can include, for example, a menu when the head-mounted device 100 is in the home or menu mode, or data included in, and/or information associated with the document when an application is open.

The head-mounted device 100 can include at least one processor 416. The at least one processor 416 can execute instructions, such as instructions stored in at least one memory device 418, to cause the head-mounted device 100 to perform any combination of methods, functions, and/or techniques described herein.

The head-mounted device 100 can include at least one memory device 418. The at least one memory device 418 can include a non-transitory computer-readable storage medium. The at least one memory device 418 can store data and instructions thereon that, when executed by at least one processor, such as the processor 416, are configured to cause the head-mounted device 100 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the head-mounted device 100 can be configured to perform, alone, or in combination with the head-mounted device 100, any combination of methods, functions, and/or techniques described herein.

The at least one memory device 418 can include a library 420. The library 420 can include a gesture library with gestures associated with states of the head-mounted device 100. The gestures stored in the library 420 can be associated with states of the head-mounted device. The gesture interpreter 410 can map, and/or correlate, raw input data received from the head-mounted device with gestures stored in the library 420 to determine a gesture that the user 300 inputted into the wearable device.

In some examples, the library 420 can include multiple libraries. Each of the multiple libraries can be associated with a state of the head-mounted device 100. When interpreting a gesture, and/or determining a gesture that the user inputted into the wearable device 150, the gesture interpreter 410 can compare the input into the display 152 of the wearable device 150 to the gestures stored in the library in association with the state of the head-mounted device 100.

The head-mounted device 100 can include at least one input/output node 422. The at least one input/output node 422 may receive and/or send data, such as from and/or to, the head-mounted device 100 and the wearable device 150, and/or may receive input and provide output from and to a user. The input and output functions may be combined into a single node, or may be divided into separate input and output nodes. The input/output node 422 can include the front-facing camera 110, the gaze-tracking camera 114, the display 108, and/or any wired or wireless interfaces (such as Bluetooth or Institute for Electrical and Electronics Engineers 802.11) for communicating with the wearable device 150 and other electronic devices.

Figure 5A:
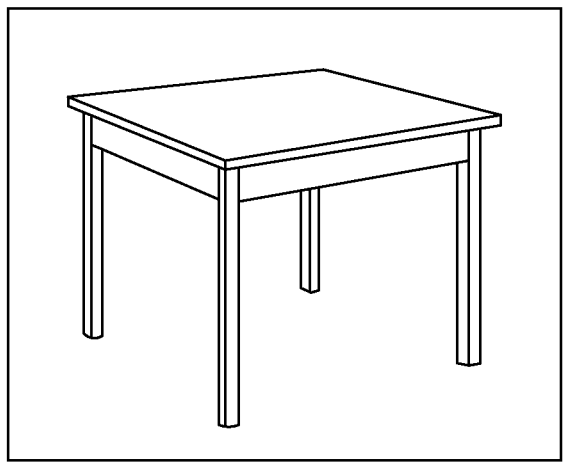
FIG. 5A shows a field of view of the head-mounted device without capturing the wearable device.
Figure 5B:
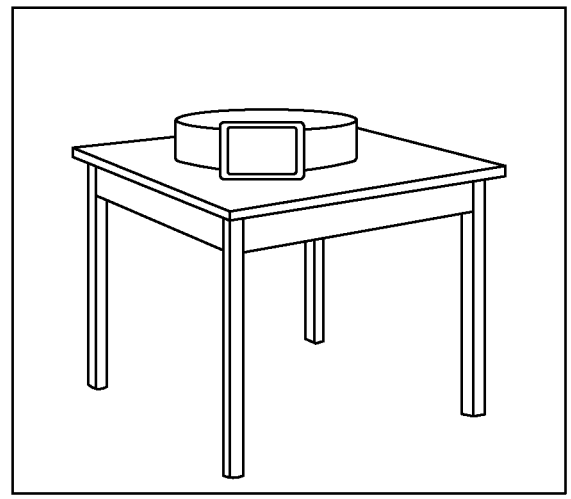
FIG. 5B shows the field of view of the head-mounted device capturing the wearable device.
Figure 5C:
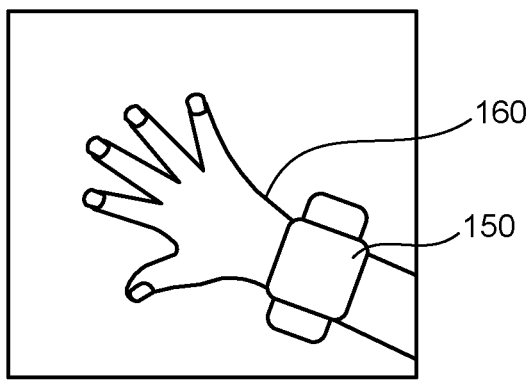
FIG. 5C shows the field of view of the head-mounted device capturing the wearable device on an arm of a user.

FIGS. 5A, 5B, and 5C show fields of view 112 captured by the front-facing camera 110. FIG. 5A shows the field of view 112 of the head-mounted device 100 without capturing the wearable device 150. In this example, in which the front-facing camera 110 did not capture an image of the wearable device 150, the head-mounted device 100 and/or the intent determiner 402 can determine that the user to 100 does not intend to provide input to the head-mounted device 100 via the wearable device 150.

FIG. 5B shows the field of view of the head-mounted device 100 capturing the wearable device 150. In some examples, the intent determiner 402 can determine that the user intends to provide input to the head-mounted device 100 via the wearable device 150 based on the wearable device 150 being within the field of view 112 of the front-facing camera 110. In some examples, the intent determiner 402 can determine that the user does not intend to provide input to the head-mounted device 100 via the wearable device 150 because the wearable device 150 is not disposed on a user's arm 160, and/or because the front-facing camera 110 did not capture an image of the user's arm 160, the wearable device 150 could simply be resting on a table.

FIG. 5C shows the field of view 112 of the head-mounted device 100 capturing the wearable device 150 on an arm 160 of a user 300. In this example, the intent determiner 402 can determine that the user intends to provide input to the head-mounted device 100 via the wearable device 150 based on the image recognizer 404 recognizing, and/or the front-facing camera 110 capturing the image of, the wearable device 150 disposed on the user's 300 arm 160.

Figure 6:
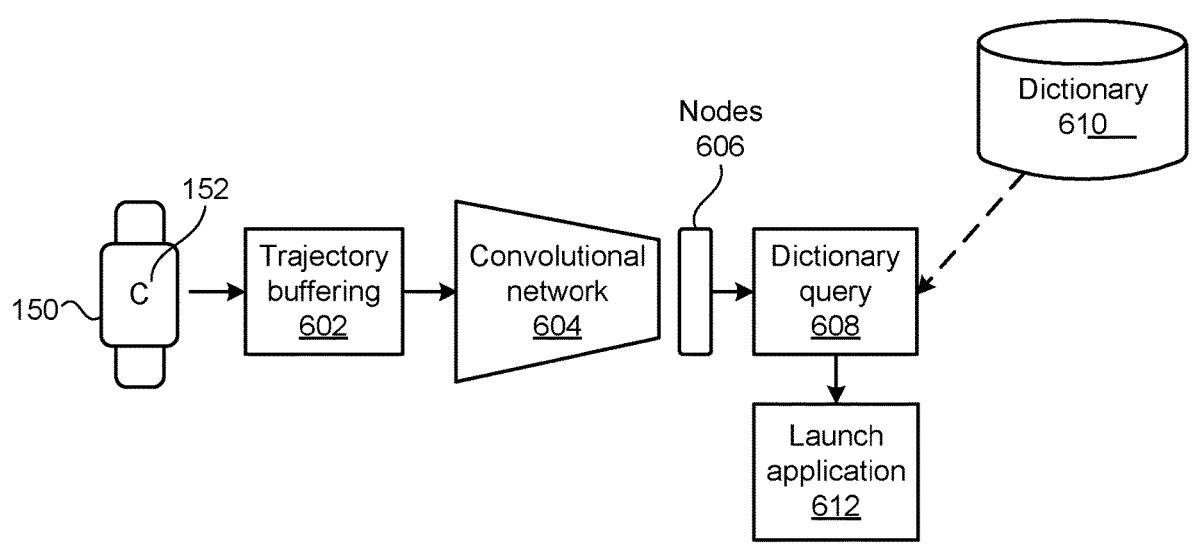
FIG. 6 shows a data flow of a gesture inputted into the wearable device and a resulting action performed by the head-mounted device.

FIG. 6 shows a data flow of a gesture inputted into the wearable device 150 and a resulting action performed by the head-mounted device 100. The user 300 can input a gesture into the display 152 of the wearable device 150 by, for example, sliding the user's 300 finger across the display 152. In the example shown in FIG. 6, the user gestures the letter 'C' into the display 152. The wearable device 150 can send the raw touch input data to the head-mounted device 100. Upon receiving the raw touch input data, the head-mounted device 100 can perform trajectory buffering (602). Trajectory buffering (602) can include storing the raw touch input data. After performing trajectory buffering (602), the gesture interpreter 410 can pass the data through a convolutional network 604. The convolutional network 604 can include multiple nodes 606. In some examples, the number of nodes 606 can be the same as the number of letters, such as twenty-six. After passing the raw touch input data through the convolutional network 604 and nodes 606, the gesture interpreter 410 can perform a dictionary query (608). The dictionary query (608) can include comparing the interpreted gesture to a dictionary 610. The dictionary 610 can be an example of the library 420, with letters as examples of the stored gestures. In the example in which the head-mounted device 100 was in the home state, after performing the dictionary query (608), the head-mounted device 100 can launch the application (612).

Figure 7A:
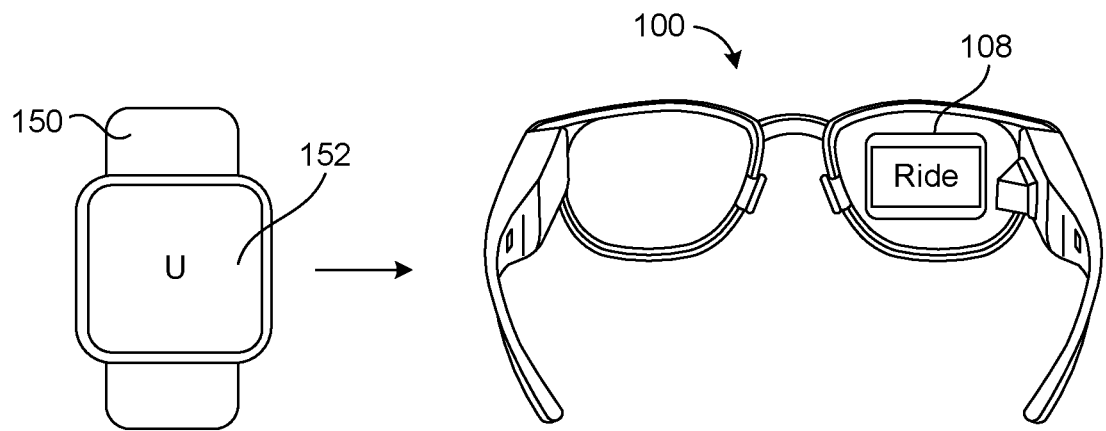
FIG. 7A shows a discrete gesture inputted into the wearable device and resulting action performed by the head-mounted device.

FIG. 7A shows a discrete gesture inputted into the wearable device 150 and resulting action performed by the head-mounted device 100. In this example, the head-mounted device 100 was in the home and/or menu state, and interpreted the gesture as a discrete gesture instructing and/or requesting the head-mounted device 100 to launch an application. In this example, the gesture is interpreted as the letter, 'U', which is the first letter of a ride service application, and the head-mounted device 100 responded to the request and/or instruction by launching the ride service application.

Figure 7B:
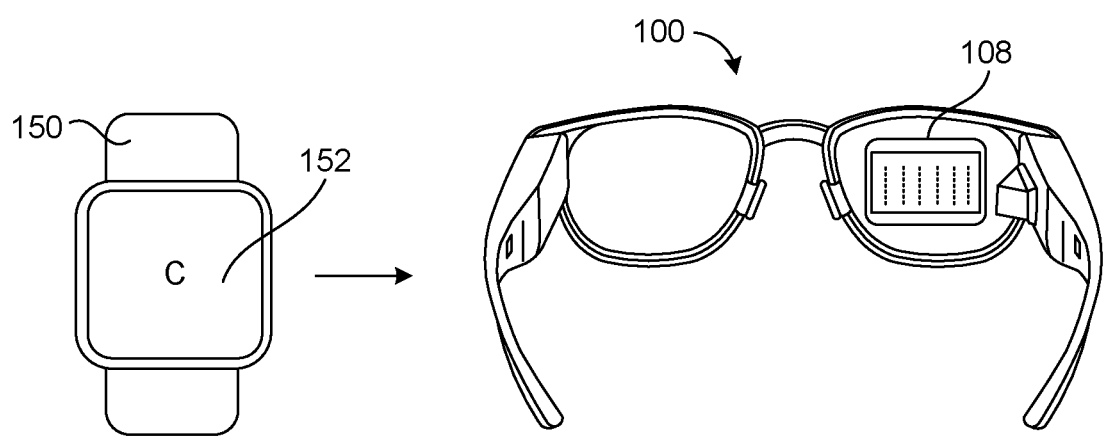
FIG. 7B shows another discrete gesture inputted into the wearable device and a resulting action performed by the head-mounted device.

FIG. 7B shows another discrete gesture inputted into the wearable device 150 and a resulting action performed by the head-mounted device 100. In this example, the head-mounted device 100 was in the home and/or menu state, and interpreted the gesture as a discrete gesture instructing and/or requesting the head-mounted device 100 to launch an application. In this example, the gesture is interpreted as the letter, 'C', which is the first letter of "Calendar," and the head-mounted device 100 responded to the request and/or instruction by launching a calendar application.

Figure 8A:
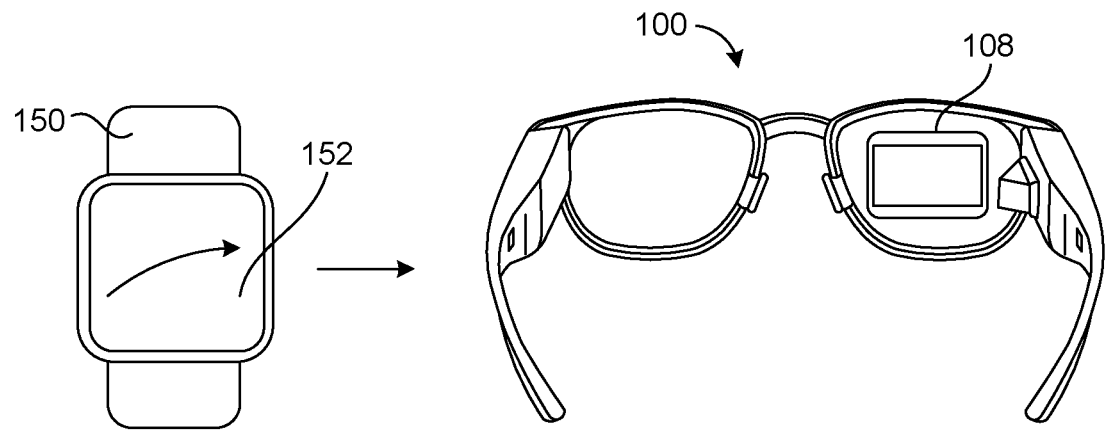
FIG. 8A shows a continuous gesture inputted into the wearable device and a resulting action performed by the head-mounted device.

FIG. 8A shows a continuous gesture inputted into the wearable device and a resulting action performed by the head-mounted device. In this example, the head-mounted device 100 was in a state of an open application, and interpreted the gesture as a continuous gesture such as swipe right, instructing the head-mounted device 100 to move a page of a document within the open application from left to right. In this example, the gesture is interpreted as the instruction to swipe right, and the head-mounted device 100 moves the page within the application from left to right.

Figure 8B:
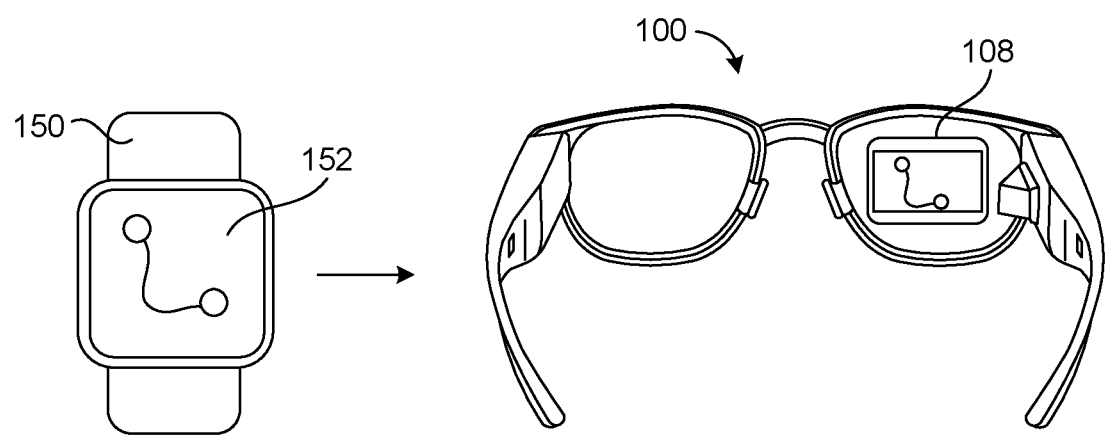
FIG. 8B shows another continuous gesture inputted into the wearable device and a resulting action performed by the head-mounted device.

FIG. 8B shows another continuous gesture inputted into the wearable device 150 and a resulting action performed by the head-mounted device 100. In this example, the head-mounted device 100 was in a state of an open application, and interpreted the gesture as a continuous gesture such as pressing the display 152 to activate a cursor and scrolling, instructing the head-mounted device 100 to move a cursor within the open application. In this example, the gesture is interpreted as the instruction to move the cursor, and the head-mounted device 100 moves the cursor within the application to the bottom of the page of the document.

Figure 9:
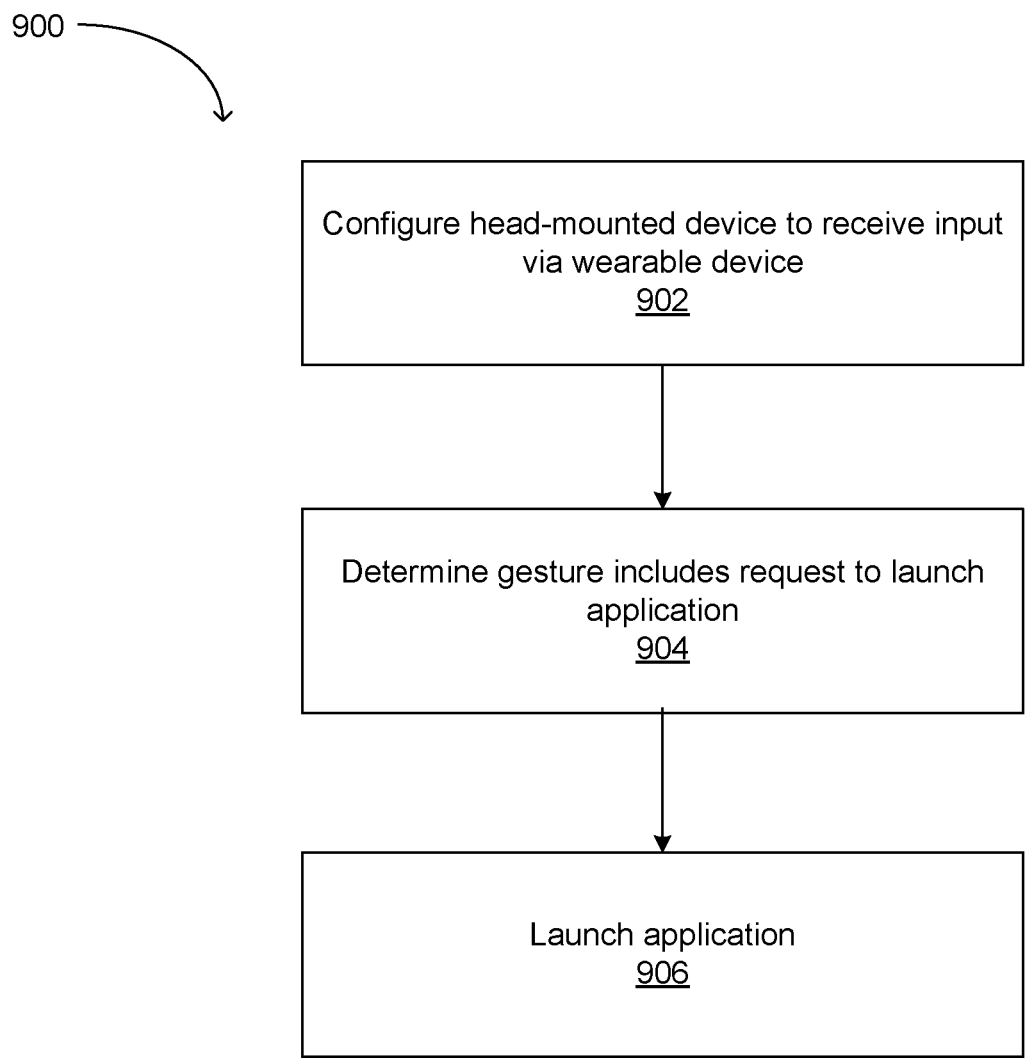
FIG. 9 is a flowchart showing a method performed by the head-mounted device.

FIG. 9 is a flowchart showing a method 900 performed by the head-mounted device 100. The method 900 can include, based on a front-facing camera 110 included in the head-mounted device 100 capturing an image of a wearable device 150, configuring the head-mounted device 100 to receive input via the wearable device 150 (902). The method 900 can further include determining that a gesture received by the wearable device 150 includes a request to launch an application (904). The method 900 can further include, in response to determining that the gesture includes the request to launch the application (904), launching the application (906).

According to an example, the configuration of the head-mounted device 100 to receive input via the wearable device 150 can be further based on determining, based on image data captured by a gaze-tracking camera 114 included in the head-mounted device 100, that a user 300 is focusing on an image presented by a display 108 included in the head-mounted device 100.

According to an example, the configuration of the head-mounted device 100 to receive input via the wearable device 150 can be further based on determining that the wearable device 150 is disposed on an arm 160 of a user 300.

According to an example, the gesture can identify the application, and the launching of the application (906) can include launching the application (906) based on the identification of the application.

According to an example, the determination that the gesture includes the request to launch the application (904) can be based on a signal received from the wearable device 150, the signal identifying the application.

According to an example, the determination that the gesture includes the request to launch the application (904) can be based on receiving touch input 304 data from the wearable device 150, and interpreting the touch input 304 data as a request to launch the application.

According to an example, the touch input 304 data can be interpreted based on a state of the head-mounted device 100.

According to an example, the method 900 can further include displaying a menu in response to the configuration of the head-mounted device 100 to receive input via the wearable device 150 (902).

According to an example, the method 900 can further include displaying a menu before configuring the head-mounted device 100 to receive input via the wearable device 150 (902).

Figure 10:
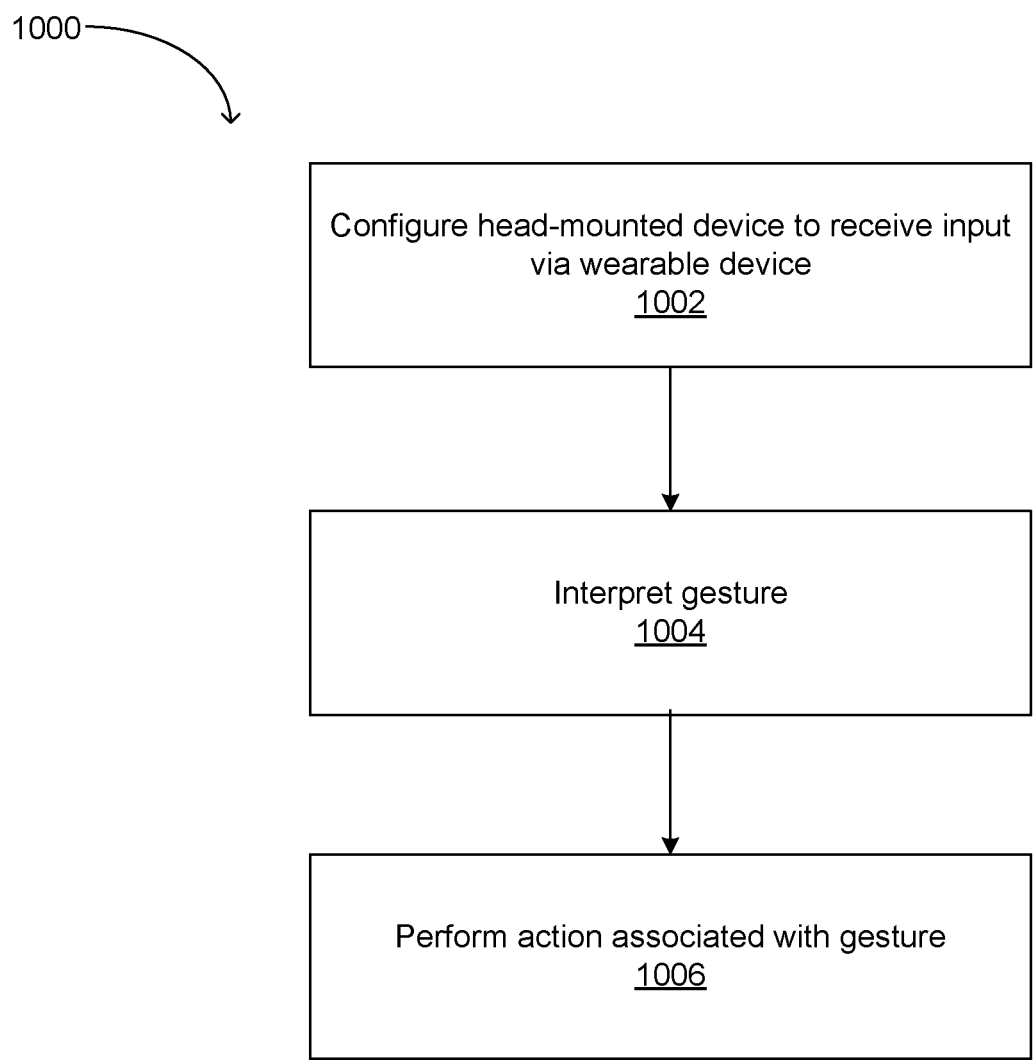
FIG. 10 is a flowchart showing a method performed by the head-mounted device.

FIG. 10 is a flowchart showing a method 1000 performed by the head-mounted device 100. The method 1000 can include, based on a front-facing camera 110 included in the head-mounted device 100 capturing an image of a wearable device 150, configuring the head-mounted device 100 to receive input via the wearable device (1002) 150. The method 1000 can further include interpreting, based on gesture data 306 received from the wearable device 150 and a state of the head-mounted device 100, a gesture, the gesture being included in a library 420 associated with the state of the head-mounted device 100 (1004). The method 1000 can further include, in response to interpreting the gesture (1004), performing an action associated with the gesture (1006).

According to an example, the state can include one of a home screen presenting applications or a launched application.

According to an example, the action can include launching an application identified by the gesture.

According to an example, the action can include scrolling within a document.

According to an example, the method 1000 can further include presenting the gesture on a display 108 included in the head-mounted device 100.

According to an example, a pattern of the gesture presented on the display 108 can be different than a pattern of the gesture received by the display 152 of the wearable device 150.

Figure 11:
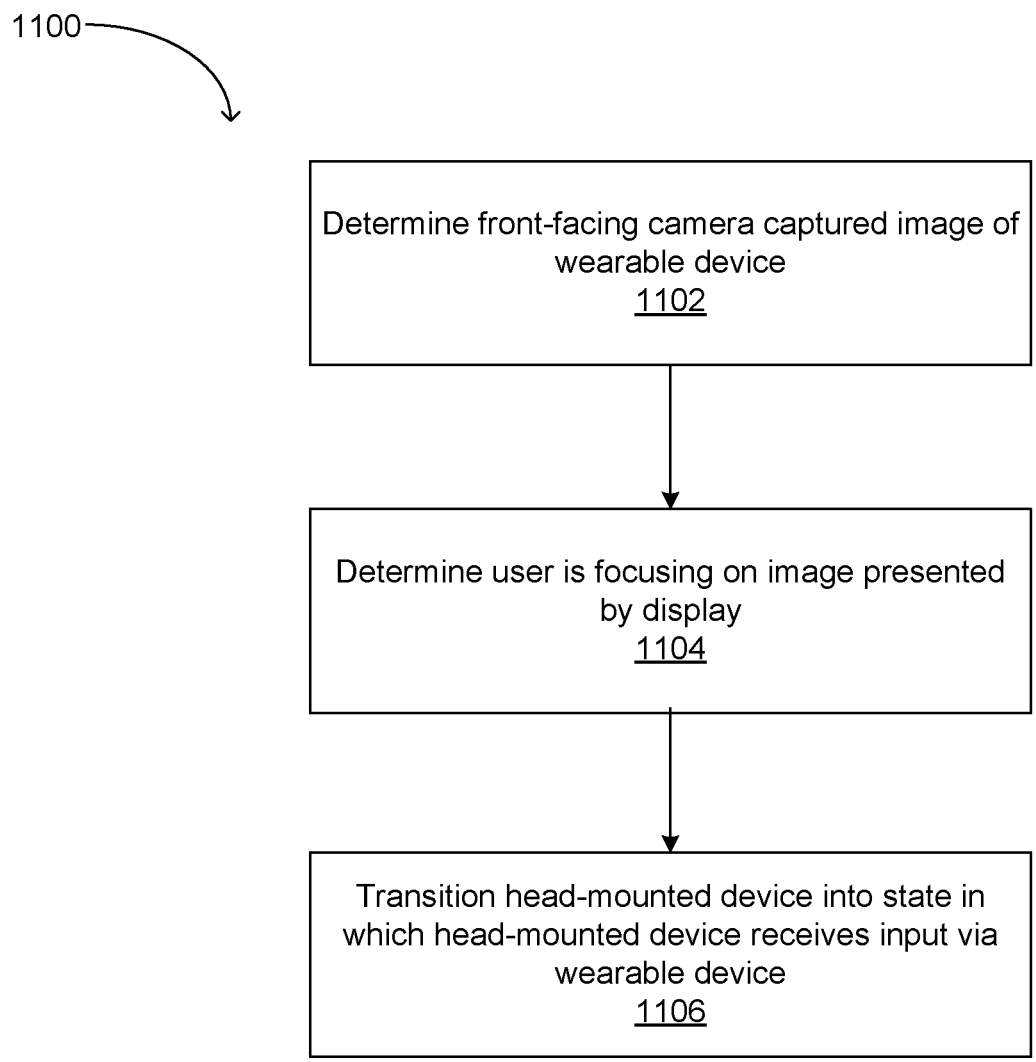
FIG. 11 is a flow chart showing a method performed by the head-mounted device.

FIG. 11 is a flow chart showing a method 1100 performed by the head-mounted device 100. The method 1100 can include determining that the front-facing camera 110 captured an image of the wearable device 150 (1102). The method 1100 can further include determining, based on image data captured by the gaze-tracking camera 114, that the user 300 is focusing on an image presented by the display 108 (1104). The method 1100 can further include transitioning the head-mounted device 100 into a state in which the head-mounted device 100 receives input via a wearable device 150 based on the determination that the front-facing camera 110 captured the image of the wearable device 150 (1102) and the determination that the user 300 is focusing on the image presented by the display 108 (1106).

According to an example, the determination that the front-facing camera 110 captured the image of the wearable device 150 (1102) further can include determining that the wearable device 150 is disposed on an arm 160 of the user 300.

According to an example, the method 1100 can further include determining, based on a gesture received by the wearable device 150, that the gesture includes a request to launch an application, and in response to determining that the gesture includes the request to launch the application, launching the application.

According to an example, the gesture can identify the application, and the launch of the application can include launching the application based on the identification of the application.

According to an example, the method 1100 can further include interpreting, based on gesture data 306 received from the wearable device 150 and a state of the head-mounted device 100, a gesture, the gesture being included in a library 420 associated with the state of the head-mounted device 100, and based on interpreting the gesture, performing an action associated with the gesture.

Figure 12:
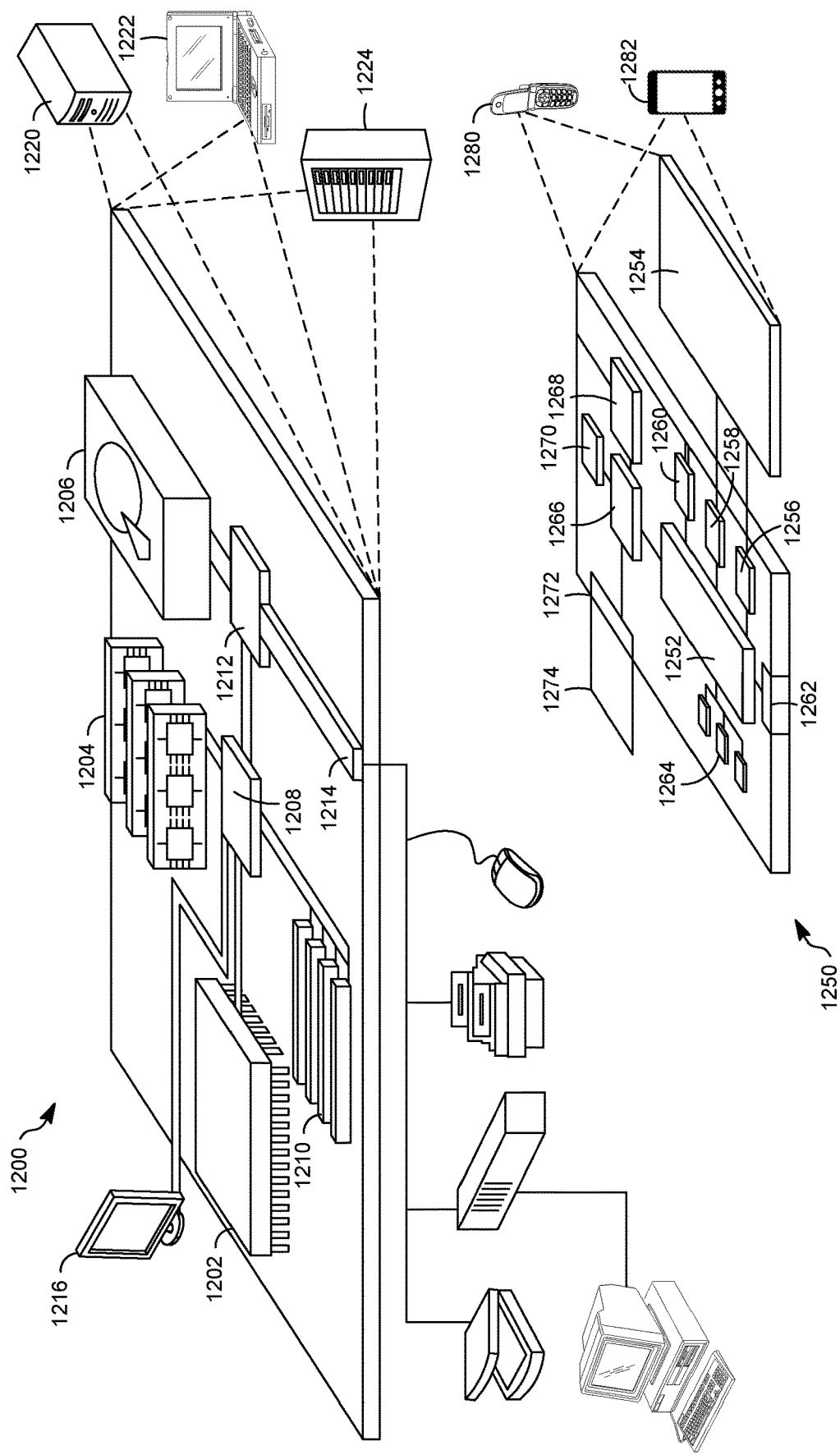
FIG. 12 shows an example of a computer device and a mobile computer device that can be used to implement the techniques described here.

FIG. 12 shows an example of a generic computer device 1200 and a generic mobile computer device 1250, which may be used with the techniques described here. Computing device 1200 is intended to represent various forms of digital computers, such as laptops, desktops, tablets, workstations, personal digital assistants, televisions, servers, blade servers, mainframes, and other appropriate computing devices. Computing device 1250 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1200 includes a processor 1202, memory 1204, a storage device 1206, a high-speed interface 1208 connecting to memory 1204 and high-speed expansion ports 1210, and a low speed interface 1212 connecting to low speed bus 1214 and storage device 1206. The processor 1202 can be a semiconductor-based processor. The memory 1204 can be a semiconductor-based memory. Each of the components 1202, 1204, 1206, 1208, 1210, and 1212, are interconnected using various busses, and may be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as display 1216 coupled to high speed interface 1208. In other implementations, multiple processors and/or multiple buses may be used, as appropriate, along with multiple memories and types of memory. Also, multiple computing devices 1200 may be connected, with each device providing portions of the necessary operations (e.g., as a server bank, a group of blade servers, or a multi-processor system).

The memory 1204 stores information within the computing device 1200. In one implementation, the memory 1204 is a volatile memory unit or units. In another implementation, the memory 1204 is a non-volatile memory unit or units. The memory 1204 may also be another form of computer-readable medium, such as a magnetic or optical disk.

The storage device 1206 is capable of providing mass storage for the computing device 1200. In one implementation, the storage device 1206 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1204, the storage device 1206, or memory on processor 1202.

The high speed controller 1208 manages bandwidth-intensive operations for the computing device 1200, while the low speed controller 1212 manages lower bandwidth-intensive operations. Such allocation of functions is exemplary only. In one implementation, the high-speed controller 1208 is coupled to memory 1204, display 1216 (e.g., through a graphics processor or accelerator), and to high-speed expansion ports 1210, which may accept various expansion cards (not shown). In the implementation, low-speed controller 1212 is coupled to storage device 1206 and low-speed expansion port 1214. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1200 may be implemented in a number of different forms, as shown in the figure. For example, it may be implemented as a standard server 1220, or multiple times in a group of such servers. It may also be implemented as part of a rack server system 1224. In addition, it may be implemented in a personal computer such as a laptop computer 1222. Alternatively, components from computing device 1200 may be combined with other components in a mobile device (not shown), such as device 1250. Each of such devices may contain one or more of computing device 1200, 1250, and an entire system may be made up of multiple computing devices 1200, 1250 communicating with each other.

Computing device 1250 includes a processor 1252, memory 1264, an input/output device such as a display 1254, a communication interface 1266, and a transceiver 1268, among other components. The device 1250 may also be provided with a storage device, such as a microdrive or other device, to provide additional storage. Each of the components 1250, 1252, 1264, 1254, 1266, and 1268, are interconnected using various buses, and several of the components may be mounted on a common motherboard or in other manners as appropriate.

The processor 1252 can execute instructions within the computing device 1250, including instructions stored in the memory 1264. The processor may be implemented as a chipset of chips that include separate and multiple analog and digital processors. The processor may provide, for example, for coordination of the other components of the device 1250, such as control of user interfaces, applications run by device 1250, and wireless communication by device 1250.

Processor 1252 may communicate with a user through control interface 1258 and display interface 1256 coupled to a display 1254. The display 1254 may be, for example, a TFT LCD (Thin-Film-Transistor Liquid Crystal Display) or an OLED (Organic Light Emitting Diode) display, or other appropriate display technology. The display interface 1256 may comprise appropriate circuitry for driving the display 1254 to present graphical and other information to a user. The control interface 1258 may receive commands from a user and convert them for submission to the processor 1252. In addition, an external interface 1262 may be provided in communication with processor 1252, so as to enable near area communication of device 1250 with other devices. External interface 1262 may provide, for example, for wired communication in some implementations, or for wireless communication in other implementations, and multiple interfaces may also be used.

The memory 1264 stores information within the computing device 1250. The memory 1264 can be implemented as one or more of a computer-readable medium or media, a volatile memory unit or units, or a non-volatile memory unit or units. Expansion memory 1274 may also be provided and connected to device 1250 through expansion interface 1272, which may include, for example, a SIMM (Single In Line Memory Module) card interface. Such expansion memory 1274 may provide extra storage space for device 1250, or may also store applications or other information for device 1250. Specifically, expansion memory 1274 may include instructions to carry out or supplement the processes described above, and may include secure information also. Thus, for example, expansion memory 1274 may be provided as a security module for device 1250, and may be programmed with instructions that permit secure use of device 1250. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1264, expansion memory 1274, or memory on processor 1252, that may be received, for example, over transceiver 1268 or external interface 1262.

Device 1250 may communicate wirelessly through communication interface 1266, which may include digital signal processing circuitry where necessary. Communication interface 1266 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1268. In addition, short-range communication may occur, such as using a Bluetooth, WiFi, or other such transceiver (not shown). In addition, GPS (Global Positioning System) receiver module 1270 may provide additional navigation- and location-related wireless data to device 1250, which may be used as appropriate by applications running on device 1250.

Device 1250 may also communicate audibly using audio codec 1260, which may receive spoken information from a user and convert it to usable digital information. Audio codec 1260 may likewise generate audible sound for a user, such as through a speaker, e.g., in a handset of device 1250. Such sound may include sound from voice telephone calls, may include recorded sound (e.g., voice messages, music files, etc.) and may also include sound generated by applications operating on device 1250.

The computing device 1250 may be implemented in a number of different forms, as shown in the figure. For example, it may be implemented as a cellular telephone 1280. It may also be implemented as part of a smart phone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method performed by a head-mounted device, the method comprising:
   configuring the head-mounted device to receive input via a wearable device based on:
   a front-facing camera included in the head-mounted device capturing an image of the wearable device; and
   images captured by a gaze-tracking camera included in the head-mounted device indicating that a user is not focusing on the wearable device while the wearable device is in view of the front-facing camera;
   determining that a gesture received by the wearable device includes a request to launch an application; and
   in response to determining that the gesture includes the request to launch the application, launching the application.

2. The method of claim 1, wherein configuring the head-mounted device to receive input via the wearable device is further based on determining, based on image data captured by a gaze-tracking camera included in the head-mounted device, that a user is focusing on an image presented by a display included in the head-mounted device.

3. The method of claim 1, wherein configuring the head-mounted device to receive input via the wearable device is further based on determining that the wearable device is disposed on an arm of a user.

4. The method of claim 1, wherein:
   the gesture identified the application; and
   launching the application includes launching the application based on the identifying the application.

5. The method of claim 1, wherein determining that the gesture includes the request to launch the application is based on a signal received from the wearable device, the signal identifying the application.

6. The method of claim 1, wherein determining that the gesture includes the request to launch the application is based on:
   receiving touch input data from the wearable device; and
   interpreting the touch input data as a request to launch the application.

7. The method of claim 6, wherein the touch input data are interpreted based on a state of the head-mounted device.

8. The method of claim 1, further comprising displaying a menu in response to the configuration of the head-mounted device to receive input via the wearable device.

9. The method of claim 1, further comprising displaying a menu before configuring the head-mounted device to receive input via the wearable device.

10. A non-transitory computer-readable storage medium comprising instructions stored thereon, the instructions, when executed by at least one processor, being configured to cause a head-mounted device to:
    configure the head-mounted device to receive input via a wearable device based on:
    a front-facing camera included in the head-mounted device capturing an image of the wearable device; and
    images captured by a gaze-tracking camera included in the head-mounted device indicating that a user is not focusing on the wearable device while the wearable device is in view of the front-facing camera;

interpret, based on gesture data received from the wearable device and a state of the head-mounted device, a gesture, the gesture being included in a library associated with the state of the head-mounted device; and in response to interpreting the gesture, perform an action associated with the gesture.

11. The non-transitory computer-readable storage medium of claim 10, wherein the state includes one of a home screen presenting applications or a launched application.

12. The non-transitory computer-readable storage medium of claim 10, wherein the action includes launching an application identified by the gesture.

13. The non-transitory computer-readable storage medium of claim 10, wherein the action includes scrolling within a document.

14. The non-transitory computer-readable storage medium of claim 10, wherein the instructions are further configured to cause the head-mounted device to present the gesture on a display included in the head-mounted device.

15. The non-transitory computer-readable storage medium of claim 14, wherein a pattern of the gesture presented on the display is different than a pattern of the gesture received by the wearable device.

16. A head-mounted device, comprising:
a frame configured to mount onto a head of a user;
a display supported by the frame, the display being configured to face at least one eye of the user;
a front-facing camera supported by the frame, the front-facing camera being configured to capture images from a direction opposite from the user;
a gaze-tracking camera supported by the frame, the gaze-tracking camera being configured to capture a direction to which the at least one eye of the user is looking; and
a processor supported by the frame, the processor being configured to transition the head-mounted device into a state in which the head-mounted device receives input via a wearable device based on:
determining that the front-facing camera captured an image of the wearable device; and
determining, based on image data captured by the gaze-tracking camera, that the user is not focusing on the wearable device while the wearable device is in view of the front-facing camera.

17. The head-mounted device of claim 16, wherein determining that the front-facing camera captured the image of the wearable device further comprises determining that the wearable device is disposed on an arm of the user.

18. The head-mounted device of claim 16, wherein the processor is further configured to:
determine, based on a gesture received by the wearable device, that the gesture includes a request to launch an application; and
in response to determining that the gesture includes the request to launch the application, launch the application.

19. The head-mounted device of claim 18, wherein:
the gesture identified the application; and
launching the application includes launching the application based on identifying the application.

20. The head-mounted device of claim 16, wherein the processor is further configured to:
interpret, based on gesture data received from the wearable device and a state of the head-mounted device, a gesture, the gesture being included in a library associated with the state of the head-mounted device; and
based on interpreting the gesture, perform an action associated with the gesture.

* * * * *